US008117425B2

(12) United States Patent
Takagi

(10) Patent No.: US 8,117,425 B2
(45) Date of Patent: Feb. 14, 2012

(54) MULTITHREAD PROCESSOR AND METHOD OF SYNCHRONIZATION OPERATIONS AMONG THREADS TO BE USED IN SAME

(75) Inventor: Hitoshi Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 975 days.

(21) Appl. No.: 12/102,151

(22) Filed: Apr. 14, 2008

(65) Prior Publication Data
US 2008/0263552 A1      Oct. 23, 2008

(30) Foreign Application Priority Data

Apr. 18, 2007  (JP) ................................. 2007-108783

(51) Int. Cl.
G06F 9/38       (2006.01)
G06F 9/52       (2006.01)
G06F 9/46       (2006.01)
(52) U.S. Cl. ..................... 712/219; 712/220; 718/102
(58) Field of Classification Search .................. 712/220, 712/219; 718/102
See application file for complete search history.

(56) References Cited

U.S. PATENT DOCUMENTS 6,470,487 B1* 10/2002 Zolotykh et al. ............... 716/104
2004/0230975 A1* 11/2004 Gewirtz et al. ................. 718/100
2005/0125791 A1* 6/2005 Welbon et al. ................. 718/100
2006/0026388 A1* 2/2006 Karp et al. ...................... 712/24
2006/0212876 A1* 9/2006 Buch ............................. 718/107

FOREIGN PATENT DOCUMENTS

JP    2000330807 A    11/2000
JP    2002268878 A     9/2002
JP    2006500639 A     1/2006

OTHER PUBLICATIONS

Mellor-Crummey, John, "Sun Niagara and an Evaluation of SMT in IBM's Power 5," Department of Computer Science, Rice University, COMP 522 Lecture 4 (Sep. 7, 2006) pp. 2-42.
Japanese Office Action for JP2007-108783 mailed Apr. 14, 2009.

* cited by examiner

*Primary Examiner* — Daniel Pan

(57) ABSTRACT

The Thread Data Base 1 holds a thread identifier to uniquely identify a thread in the system. The Check means 3 lets, when no thread being a target exist in the same processor, a trap (TRAP) 10 occur. The Issue means 2, when a thread being a target exists in the same processor, at a time of issuing a subsequent instruction, successively inputs a thread 9 to be executed next, as a thread serving as a target, into a pipeline. The Gate (G) means 11 uses data on the execution of a thread as an input for computation of a thread serving as a succeeding target. The Switch means 13 transfers data in a context of a thread to a context of a target thread without inputting the target thread as a non-executable thread into a pipeline while the thread is being executed.

9 Claims, 4 Drawing Sheets

MULTITHREAD PROCESSOR AND METHOD OF SYNCHRONIZATION OPERATIONS AMONG THREADS TO BE USED IN SAME

This application is based upon and claims the benefit of priority from Japanese patent application No. 2007-108783, filed on Apr. 18, 2007, the disclosure of which is incorporated herein in its entirety by reference.

BACKGROUND OF THE INVENTION

1. Field of the Invention

The present invention relates to a multithread processor and a method of synchronization operations to be used in the multithread processor and particularly to the synchronization operations among threads in the multithread processor.

2. Description of the Related Art

In the multithread processor, a program is divided, in a single process, into execution units each being called a thread which are executed in parallel. To perform this process, a plurality of threads shares memory space. Therefore, when the plurality of threads handles shared data, data contention occurs in some cases and, in order to prevent the occurrence of the data contention, synchronization operations among threads (exclusive operation in which, while a thread handles shared data, any other thread is not allowed to handle the shared data) are performed. FIGS. 2 to 4 show conventional synchronization operations among threads.

In FIG. 2, the CPU (Central Processing Unit) 101 is executing a program in an instruction area 105 specified by the Thread 102. The thread 102 sets a synchronization word 106 and its initial value to "1" (other than "0") so that the thread 102 is synchronized with the Target 103.

When the execution of the thread 102 reaches the CHK (Check) instruction step in the instruction area 105, the synchronization word 106 is referred to and, if its value is other than 0, the thread 102 is changed from an R (Runnable) state to a S (Suspend) state and is connected to the Thread Queue 108 to which all threads being executed in the system are connected.

When the execution by the CPU 101 progresses, as shown in FIG. 3, the Target 103 is loaded into the CPU 101 and is executed. In the instruction area of the Target 103 exists the LAC (Load and Clear) instruction which is used to inform of the completion of synchronization with the thread 102 and, when this instruction is executed, the value of the synchronization word 106 is changed from "1" to "0".

Moreover, when the execution by the CPU 101 progresses, as shown in FIG. 4, the Thread 102 is again loaded and executed and the execution again starts from the CHK instruction and, since the synchronization word 106 is "0" this time, subsequent instructions are successively executed. Thus, the synchronization among threads can be realized. Data is received and passed according to a method determined separately.

General systems of the multithread processor are disclosed in "Sun Niagara and an Evaluation of SMT in IBM's Power 5" (John Mellor—Crummey, Department of Computer Science Rice University, COMP 522 Lecture 4 7 Sep. 2006).

SUMMARY OF THE INVENTION

However, in the conventional synchronization operations among threads described above, a problem arises in that, due to a requirement of memory access processes of referring to a synchronization word for the synchronization among threads, costs for the synchronization are high.

Also, in the conventional synchronization operations among threads, receiving and passing of data are performed by the interaction of another memory area, thus causing a problem of needless costs.

In the software heavily using threads written by a programming language such as Java (registered trademark), C#, C, and a like, in order to ensure dependence relationship among threads, synchronization operations among threads are required. In the synchronization operations among threads, the synchronization operations are performed ordinarily by the interaction of memory to perform receiving and passing of data, which causes costs for processing to increase and a great influence on performance of software using frequently threads.

In the multithread processor, owing to its original properties, there is a high possibility that threads requiring synchronization exist in the same processor and, therefore, if synchronization and receiving/passing of data can be realized within the processor, contribution to the improvement of performance of a program can be greatly expected.

In view of the above, it is an object of the present invention to provide a multithread processor and a method of synchronization operations among threads with a high-speed performance.

According to a first aspect of the present invention, there is provided a multithread processor for executing a plurality of threads in parallel at every time of issuing an instruction by pipeline processing, including:

a holding unit to hold information about each of the plurality of threads and a thread identifier to uniquely identify a thread in each piece of the information;

a judging unit to judge whether or not a target thread being an object to be synchronized with a thread exists in the same processor by using the thread identifier held by the holding unit;

a trap generating unit to let a trap occur when the judging unit judges that the target thread does not exist in the same processor; and an issuing unit to successively input, when the judging unit judges that the target thread exists in the same processor, the target thread as a thread to be executed next, at a time of issuing a succeeding instruction, into the pipeline.

According to a second aspect of the present invention, there is provided a method of synchronization operations among threads to be used in a multithread processor for executing a plurality of threads in parallel by pipeline processing including;

i) holding information about each of the plurality of threads and a thread identifier to uniquely identify a thread in each piece of the information in a holding unit;

ii) judging whether or not a target thread being an object to be synchronized with a thread exists in the same processor by using the thread identifier held in the holding step;

iii) letting a trap occur when it is judged in the judging step that the target thread does not exist in the same processor; and iv) successively inputting, when it is judged in the judging step that the target thread exists in the same processor, the target thread as a thread to be executed next, at a time of issuing a succeeding instruction, into the pipeline.

According to a third aspect of the present invention, there is provided a multithread processor for executing a plurality of threads in parallel at every time of issuing an instruction by pipeline processing, comprising:

a holding means to hold information about each of the plurality of threads and a thread identifier to uniquely identify a thread in each piece of the information;

a judging means to judge whether or not a target thread being an object to be synchronized with one thread exists in a same processor by using the thread identifier held by the holding means;

a trap generating means to let a trap occur when the judging unit judges that the target thread does not exist in the same processor; and an issuing means to successively input, when the judging means judges that the target thread exists in the same processor, the target thread as a thread to be executed next, at a time of issuing a succeeding instruction, into the pipeline.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
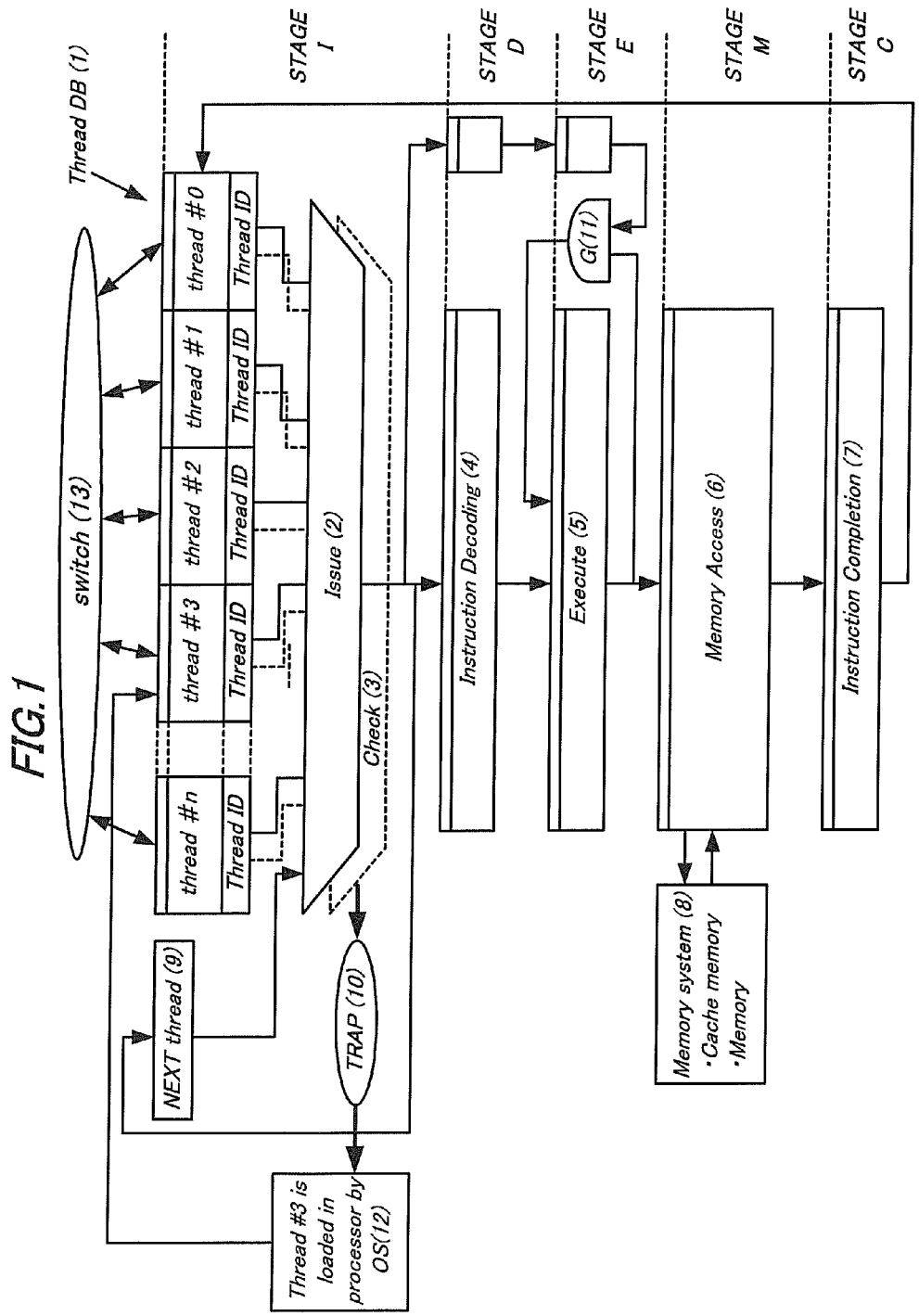
FIG. 1 is a block diagram showing operations of a multi-thread processor according to an embodiment of the present invention.
Figure 2:
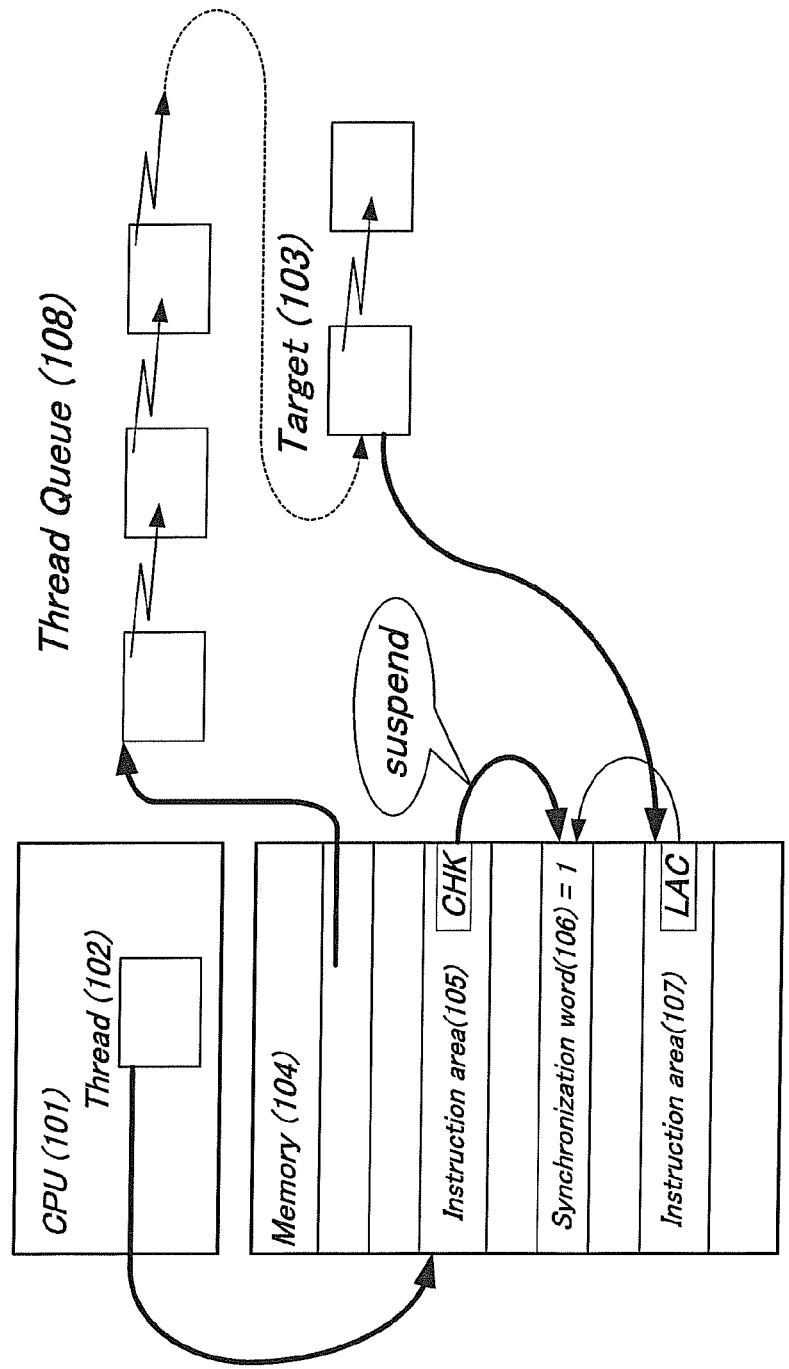
FIG. 2 is a diagram showing conventional synchronization operations among threads.
Figure 3:
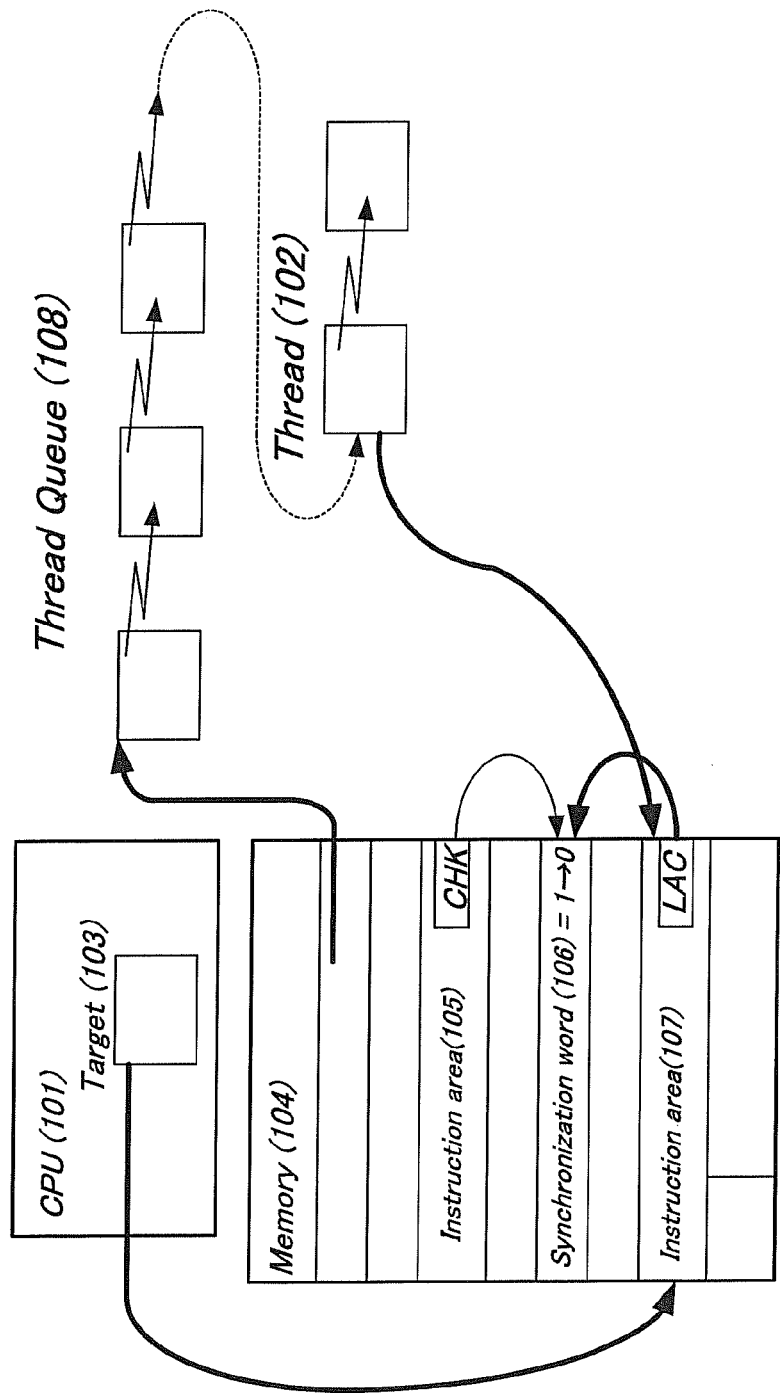
FIG. 3 is a diagram showing conventional synchronization operations among threads.
Figure 4:
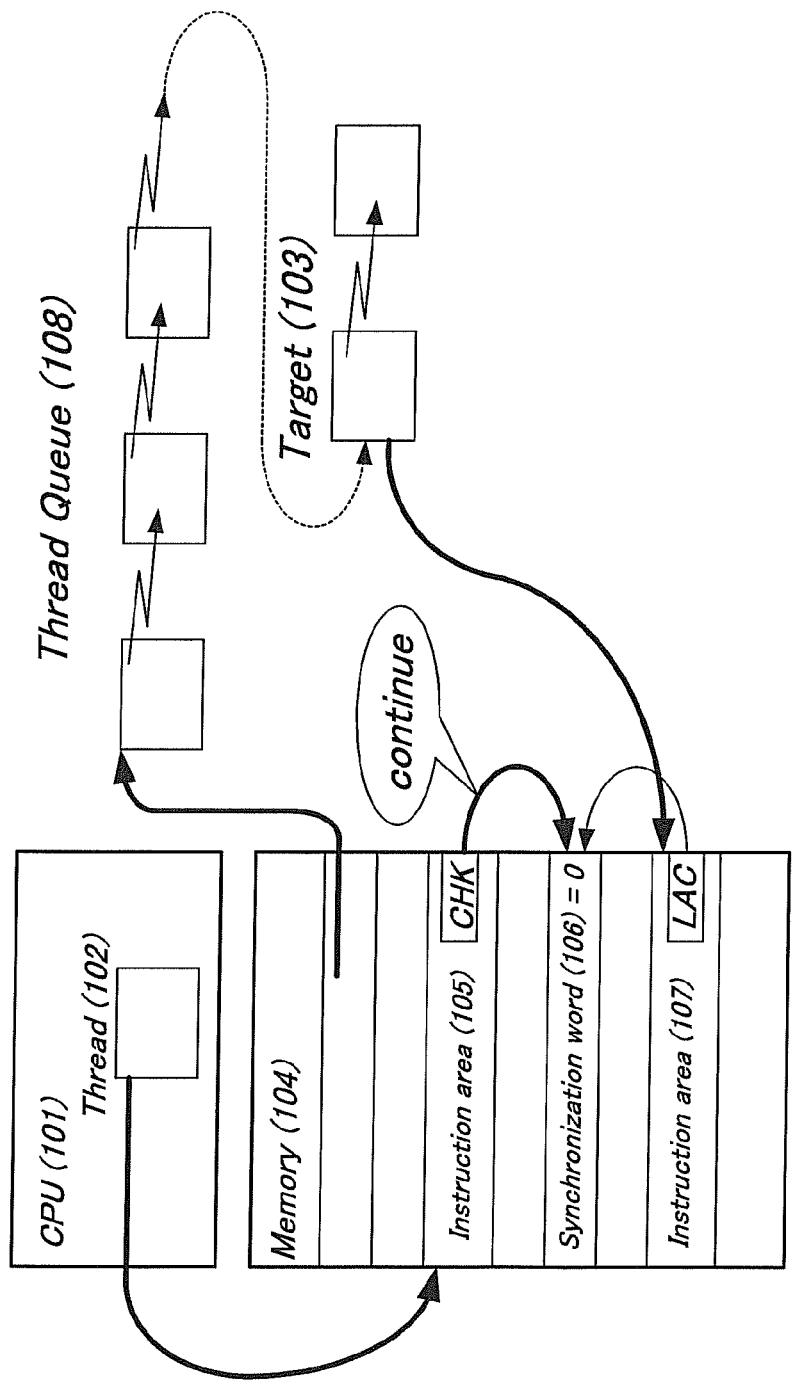
FIG. 4 is a diagram showing conventional synchronization operations among threads.

Next, an embodiment of the present invention is described by referring to drawings. FIG. 1 is a block diagram showing operations of a multithread processor of the embodiment of the present invention. The multithread processor of the embodiment, as shown in FIG. 1, includes a Thread Data Base 1, an Issue means 2, a Check means 3, an Instruction Decoding means 4, an Execute means 5, a Memory Access means 6, an Instruction Completion processing means 7, a register 9, a Gate (G) means 11, and a Switch means 13. A memory system 8 is disposed inside or outside the multithread processor. Also, a pipeline of the multithread processor is made up of STAGEs I, D, E, M, and C steps. At the STAGE 1 are arranged the Thread Data Base 1, Issue means 2, and Check means 3. At the STAGE D is disposed the Instruction Decoding means 4. At the STAGE E are arranged the Execute means 5 and Gate (G) 11. AT the STAGE M is disposed the Memory Access means 6. At the STAGE C is disposed the Instruction Completion processing means 7. As shown in FIG. 1, the content of the Thread Data Base 1 is made up of a plurality of threads #0 to #n each holding its own information and each piece of the information contains a Thread identifier to uniquely identify each of the threads #0 to #n in the system. Moreover, the Thread Data Base 1 supplies the held information about each of the threads to the Issue means 2.

The Check means 3 judges, if an instruction in one thread to be executed existing in the Thread Data Base 1 is a synchronization instruction, using the Thread identifier, whether or not a thread (hereinafter, a target thread) to be synchronized with the above thread exists in the Thread Data Base 1 or in the same processor. The Check means 3, if the target thread does not exist in the Thread Data Base 1 or in the same processor, lets a trap (TRAP) 10 occur. That is, the Check means 3 traps the synchronization instruction. After that, the Check means 3 loads the target thread into the Thread Data Base 1 by the interaction of an OS (Operating System) (not shown) (see processing 12 in FIG. 1). The Issue means 2, when the Check means 3 judges that the target thread exists in the Thread Data Base 1 or in the same processor, successively inputs the target thread as a thread to be executed next, at a time of issuing a succeeding instruction, into the pipe line. This process is described further in detail. The Issue means 2, if the target thread exists in the Thread Data Base 1 or in the same processor, stores the information about the target thread in the register 9 used to store a subsequent thread, in order to input the target thread in a cycle following the cycle for inputting the instruction in the thread. Then, the Issue means 2, after the execution of the thread, supplies a target thread stored in the register 9 to the Instruction Decoding means 4.

The Instruction Decoding means 4 decodes the thread supplied from the Issue means 2 and transfers the decoded thread to the Execute means 5. The Execute means 5 performs computation on the thread supplied from the Instruction Decoding means 4 and transfers data on results from the execution to the Gate (G) means 11 and Memory Access means 6.

The Gate (G) means 11 supplies data on the execution result of a thread to the Execute means 5 simultaneously with the supply of the target thread. The execution means 5 performs computing of the target thread based on the data on the execution result of one thread and based on the target thread.

The Switch means 13 transfers data in a context of one thread to a context of a target thread without inputting the target thread as a non-executable thread into a pipeline while the thread is being executed to synchronize one thread with the target thread.

The Memory Access means 6 performs processing of accessing to the memory systems 8 to store results from the execution of threads by the Execute means 5. The Instruction Completion processing means 7 terminates the execution of instructions and commits processing states. Instructions are aborted or trapped.

Thus, the multithread processor of the embodiment of the present invention has the detecting means (that is, the Check means 3 and Issue means 2) to detect presence or absence of threads to be synchronized with one another and the speeding-up means (that is, the Gate (G) 11 means and Switch means 13) to speed up the synchronization among threads and, therefore, it is possible to speed up the synchronization operations of programs made up of the plurality of threads #1 to #n, which can lead to speeding-up of entire processing.

The multithread processor of the embodiment of the present invention is described as above, however, general operations of the above multithread processor are well known to those skilled in the art and have no direct relation to the present invention and their description are omitted accordingly.

Next, operations of the multithread processor of the embodiment of the present invention shown in FIG. 1 are described below. In the multithread processor of the embodiment of the present invention, pipeline processing including the processes at each of the STAGEs I, D, E, M, and C is performed.

The processes are described further in detail. In the STAGE I, the Issue means 2 and Check means 3 perform processing. In the STAGE D, the Instruction decoding means 4 performs processing of decoding. In the STAGE E, the Execute means 5 performs the processing of executing threads.

Also, in the STAGE M, the Memory Access means 6 performs the processing of accessing the memory system 8. In the STAGE C, the Instruction completion processing means 7 terminates instructions.

In FIG. 1, when the instruction in the thread #0 is a synchronization instruction to be executed next in the Thread Data Base 1, the Check means 3 judges whether or not a thread (target thread) to be synchronized exists in the Thread Data Base 1. Then, the Check means 3, if there is no thread to be synchronized, traps the instruction and loads, by the interaction by the OS, the thread #3 being the thread to be synchronized into the processor (see processing 12 in FIG. 1).

When there is a thread to be synchronized, the Issue means 2 stores the information about the thread #3 into the register 9 in a cycle following the cycle for inputting the instruction in the thread #0. This causes the thread #3 to be input successively after the execution of the thread #0 (see processing at the STAGE I in FIG. 1).

When the thread #0 is executed by the Execute 5, the result from the execution is used as an input for succeeding thread #3 via the Gate (G) means 11 and, when the thread #3 is executed by the Execute means 5, receiving and passing of data is completed (see processing at the STAGE E in FIG. 1). That is, the execution means 5 performs computation on the thread #0 and, after that, performs computation on the thread #3 based on the execution result of thread #0 and based on the thread #3.

Moreover, the multithread processor may be configured so that, as an alternative means of receiving and passing of data at the STAGE E, without the execution of the thread #3 with its execution slot being empty, data is received and passed via the Switch means 13.

Thus, according to the embodiment, before the execution by the Issue means 2 or Check means 3, the presence or absence of a thread to be synchronized is detected and, therefore, speeding-up of the synchronization operations among threads can be achieved.

Also, according to the embodiment, the synchronization operations among threads are performed without the interaction by memory in the same processor and, therefore, it is possible to speed up the synchronization operations among threads.

Furthermore, according to the embodiment, for data exchange in the synchronization operations among threads, data is received and passed among the pipeline stages and, therefore, it is made possible to speed up the data exchange.

It is apparent that the present invention is not limited to the above embodiment, but various embodiments and changes may be made thereto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-108783 filed on Apr. 18, 2007 and including specification, claims, drawings and summary. The disclosure of the above Japanese Patent Application is incorporated herein by reference in its entirety.

What is claimed is:

1. A multithread processor for executing a plurality of threads in parallel at every time of issuing an instruction by pipeline processing, comprising:
    a holding unit to hold information about each of the plurality of threads and a thread identifier to uniquely identify a thread in each piece of the information;
    a judging unit to judge whether or not a target thread being an object to be synchronized with one thread exists in a same processor by using the thread identifier held by the holding unit;
    a trap generating unit to let a trap occur when the judging unit judges that the target thread does not exist in the same processor; and
    an issuing unit to successively input, when the judging unit judges that the target thread exists in the same processor, the target thread as a thread to be executed next, at a time of issuing a succeeding instruction, into the pipeline.

2. The multithread processor according to claim 1, wherein the judging unit judges whether or not the target thread exists in the same processor depending on whether or not the holding unit holds the target thread.

3. The multithread processor according to claim 1, further comprising an executing unit to execute the one thread exists in the same processor and a unit to use data on a result from the execution of the one thread exists in the same processor by the executing unit as an input for computation performed at a time of execution of the target thread by the executing unit.

4. The multithread processor according to claim 1, still further comprising a unit to transfer data in a context of the one thread exists in the same processor to a context of the target thread without inputting the target thread, as a non-executable thread, into the pipeline while the one thread exists in the same processor is being executed, to thereby synchronize the one thread exists in the same processor with the target thread.

5. A method of synchronization operations among threads to be used in a multithread processor for executing a plurality of threads in parallel by pipeline processing comprising:
    i) holding information about each of the plurality of threads and a thread identifier to uniquely identify a thread in each piece of the information in a holding unit;
    ii) judging whether or not a target thread being an object to be synchronized with a thread exists in a same processor by using the thread identifier held in the holding step;
    iii) letting a trap occur when it is judged in the judging step that the target thread does not exist in the same processor; and
    iv) successively inputting, when it is judged in the judging step that that the target thread exists in the same processor, the target thread as a thread to be executed next, at a time of issuing a succeeding instruction, into the pipeline.

6. The method of synchronization operations among threads according to claim 5, wherein whether or not the target thread exists in the same processor is judged depending on whether or not the holding unit holds the target thread.

7. The method of synchronization operations among threads according to claim 5, further comprising: v) executing the one thread exists in the same processor and a step of using data on a result from the execution of the one thread exists in the same processor in the executing step as an input for computation performed at a time of execution of the target thread in another executing step.

8. The method of synchronization operations among threads according to claim 5, further comprising: vi) transferring data in a context of the one thread exists in the same processor to a context of the target thread without inputting the target thread, as a non-executable thread, into a pipeline while the one thread exists in the same processor is being executed to thereby synchronize the one thread exists in the same processor with the target thread.

9. A multithread processor for executing a plurality of threads in parallel at every time of issuing an instruction by pipeline processing, comprising:
    a holding means to hold information about each of the plurality of threads and a thread identifier to uniquely identify a thread in each piece of the information;

a judging means to judge whether or not a target thread being an object to be synchronized with one thread exists in a same processor by using the thread identifier held by the holding means;

a trap generating means to let a trap occur when the judging unit judges that the target thread does not exist in the same processor; and an issuing means to successively input, when the judging means judges that the target thread exists in the same processor, the target thread as a thread to be executed next, at a time of issuing a succeeding instruction, into the pipeline.

* * * * *